(12) United States Patent
Grossetie et al.

(10) Patent No.: US 7,277,209 B1
(45) Date of Patent: Oct. 2, 2007

(54) COMPUTER-ASSISTED HOLOGRAPHIC METHOD AND DEVICE

(75) Inventors: Jean-Claude Grossetie, Ispra (IT); Pierre Noirard, Lipsheim (FR)

(73) Assignee: European Community (EC), Luxemburg (LU)

( * ) Notice: Subject to any disclaimer, the term of this patent is extended or adjusted under 35 U.S.C. 154(b) by 0 days.

(21) Appl. No.: 09/530,968

(22) PCT Filed: Nov. 17, 1998

(86) PCT No.: PCT/EP98/07538

§ 371 (c)(1),
(2), (4) Date: May 19, 2000

(87) PCT Pub. No.: WO99/27421

PCT Pub. Date: Jun. 3, 1999

(30) Foreign Application Priority Data

Nov. 27, 1997 (EP) ................................. 97 402 797

(51) Int. Cl.
*G03H 1/08* (2006.01)
*G03H 1/26* (2006.01)
(52) U.S. Cl. .............................. 359/9; 359/22; 359/900
(58) Field of Classification Search .................... 359/9, 359/1, 20, 21, 29, 33, 35, 32, 900, 22
See application file for complete search history.

(56) References Cited

U.S. PATENT DOCUMENTS

| | | | | |
|---|---|---|---|---|
| 4,969,700 A | * | 11/1990 | Haines | 359/9 |
| 5,852,504 A | * | 12/1998 | Kato et al. | 359/9 |
| 6,038,042 A | * | 3/2000 | Takemori | 359/9 |
| 6,344,909 B1 | * | 2/2002 | Grossetie et al. | 359/9 |

OTHER PUBLICATIONS

Hariharan, P. *Optical holography. Principles, techniques and applications*, Cambridge University Press, Cambridge, 1984. pp. 146-155.

* cited by examiner

*Primary Examiner*—Audrey Chang
(74) *Attorney, Agent, or Firm*—Bacon & Thomas, PLLC

(57) ABSTRACT

The method consists of computing (E1-E4) a set of two-dimensional images in a three-dimensional geometrical space representing a virtual object from respective different viewpoints. The virtual object is represented by digital data stored in a computer. Holograms are computed (E5-E6) for the respective two-dimensional images using a fast complex transform, such as a Fourier transform. The holograms are then juxtaposed (E7) to form a digital hologram of the object which is physically reproduced (E8) by a spatial light modulator. A three-dimensional image of the object is obtained by illuminating the spatial light modulator with a coherent source.

22 Claims, 5 Drawing Sheets

COMPUTER-ASSISTED HOLOGRAPHIC METHOD AND DEVICE

Figure 1:
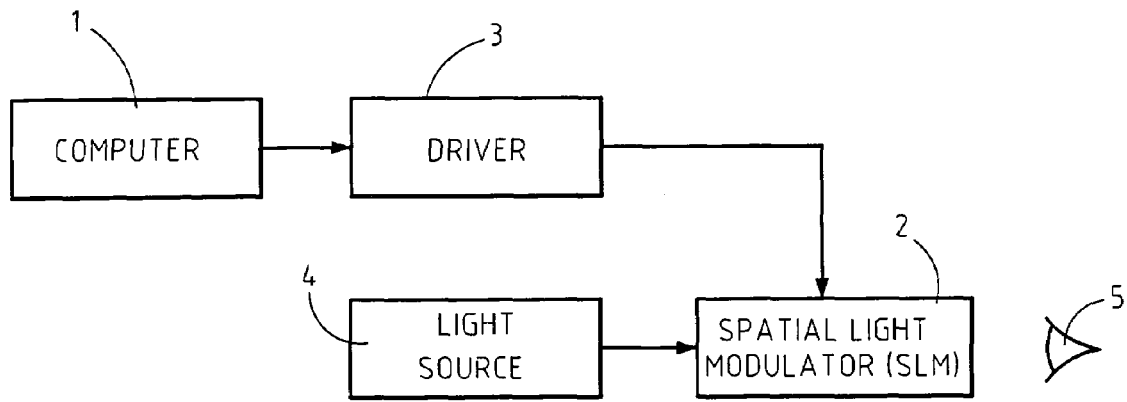

The present invention relates generally to the reproduction of three-dimensional images and more particularly to the digital synthesis of holograms and the reproduction of three-dimensional images from the holograms.

Several techniques for reproducing three-dimensional images are known in the art.

Some systems, referred to as "stereoscopic" systems, produce two offset images of the same scene, each of which is viewed by a respective eye of an observer. Depth of field and volume are then reconstructed by the brain of the observer. The majority of such systems require the observer to wear bulky accessories such as spectacles or headsets to separate and differentiate the images sent to each eye. Also, they have only a binocular angle of vision of the scene to be represented.

One particular example of another technique, referred to as the "autostereoscopic" technique, entails taking a photograph of a scene through a plane mesh of sufficiently small lenses so as to associate one viewpoint of the photographed scene with each lens. The photograph obtained in this way gives an illusion of relief but produces a limited effect of depth. This technique does not allow for the natural accommodation of the eye and in the current state of the art can reproduce three-dimensional images in real time only with difficulty.

Holograms are the most reliable way of reproducing three-dimensional images since they reproduce the optical field as generated by the scene. In particular, this method allows completely for the accommodation of the eye. Analog holograms are produced by projecting a coherent optical wave emitted by a laser onto an object, picking up an optical wave diffused by the object and derived from that wave, and causing the diffused optical wave to interfere with a reference wave consisting of another portion of the beam emitted by the laser, to produce an interference field which is recorded on a photosensitive medium such as a photographic plate. A three-dimensional image of the original scene can then be observed by illuminating the photographic plate with a coherent wave. This purely analog method offers excellent reproduction quality but cannot reproduce three-dimensional images in real time.

There are digital holographic methods for producing three-dimensional images in real time. U.S. Pat. No. 5,668,648 describes a computer-assisted holographic system capable of digitally synthesizing the hologram of a virtual object and reproducing an image from that hologram. The virtual object is sampled into sampling points which are treated as elementary spherical optical sources. Diffraction fields are computed for the respective sampling points and are then superposed. An interpolation technique is used to improve the resolution of the resulting diffraction field. An interference field (hologram) based on the resultant diffraction field and data representing a reference wave is then generated and reproduced physically by a spatial light modulator.

The digital synthesis of holograms by the above method necessitates long and complex calculations, in particular to determine a diffraction field associated with each sampling point on the object and to interpolate the resulting diffraction field.

The present invention aims to provide a holographic synthesis method capable of generating holograms digitally in real time, generally necessitating less computation than the prior art methods, and providing three-dimensional spatial reproduction of images.

To this end, the present invention provides a method of producing a hologram from a virtual object defined in a three-dimensional geometrical space, characterized in that it includes the following steps:

computing a set of two-dimensional images representing the object from respective different viewpoints in the three-dimensional space, computing holograms respectively corresponding to said two-dimensional images, and combining said holograms to form a hologram of the object.

The expression "virtual object" means data representing a real object which is, for example, stored in a computer.

The steps defined above constitute a digital model of the production of an analog hologram of a three-dimensional object. An analog hologram is made up of a combination of elementary holograms, or diffractive fields, which reproduce two-dimensional images representing the object concerned from respective different viewpoints when they are individually illuminated by a coherent beam of light.

The step of computing the set of two-dimensional images advantageously includes the following steps:

defining in the three-dimensional space a matrix of points in a first geometrical plane separate from the object, and projecting images of the object as seen respectively from said points of said matrix onto a second geometrical plane which is preferably between the object and the first plane and parallel to the first plane, the projected images constituting said two-dimensional images.

For each point of the matrix, the projection step preferably consists of projecting points of the object onto the second plane along respective straight lines passing through said points of the object and said each point of the matrix.

According to the invention, the two-dimensional images are defined by respective real functions and the step of computing the holograms comprises the following steps for a given two-dimensional image:

transforming the given two-dimensional image defined by the corresponding real function into a complex two-dimensional image defined by a complex function, oversampling the complex image, simulating the production of a diffracted image resulting from the diffraction of an optical wave by the oversampled complex image, adding a complex field representing a reference optical wave to the resulting diffracted image, and encoding values taken by the amplitude of the sum of said complex field and the resulting diffracted image to produce the hologram associated with the given two-dimensional image.

A "real or complex function" means a function of two variables taking real or complex values, respectively. The real function is typically an intensity distribution and the complex function a distribution of complex numbers each defined by a real amplitude and a real phase.

The step of transforming the given two-dimensional image into a complex image derives from the given two-dimensional image an image which is defined by complex numbers which are the optimum representation of the actual optical field and facilitate the computations employed in the step of simulating the production of a diffracted image.

The step of oversampling the complex image increases the number of pixels of the resulting hologram of the given two-dimensional image because the computations employed during the subsequent simulation and addition steps are performed on a greater number of image points. The oversampling step can consist of inserting the complex image into a larger image in which the intensity of pixels outside the original complex image is made equal to 0. In this case, implementing the step of oversampling the complex image after the steps of transforming the two-dimensional image into a complex image avoids the need to compute the complex function for points of the oversampled image outside the original complex image.

The transform step can include the following steps:

determining amplitude values each depending on the square root of a corresponding value taken by the real function of the given two-dimensional image, and associating a phase with each of the amplitude values so that an amplitude value and a phase value are defined for each point of the complex image.

By averaging the amplitude values of the hologram, associating a phase with each amplitude value avoids peaks of excessively high amplitude in the resulting hologram of the given two-dimensional image.

The step of simulating the production of a diffracted image can include the computation of at least one of the following complex transforms: Fourier transform, Walsh transform, Hankel transform, orthogonal polynomial transform, Hadamar transform, Karhunen-Loeve transform, multiresolution discrete wavelet transform, adaptive wavelet transform and a transform consisting of a composite of at least two of the above transforms.

The choice of a complex transformation can depend on the distance between the first and second geometrical planes, each complex transformation being more particularly suited to a predetermined range of distances between the first and second geometrical planes.

To be more precise, the step of simulating the production of a diffracted image can consist of computing a convolutional product, associated with the oversampled complex image, of two components, by applying the transform which is the inverse of said complex transform to the product of the respective complex transforms of said two components.

Until now, the skilled person has regarded the Fourier transform, which is widely used in optics, as the best possible transform for calculating a convolutional product of this kind. However, experiments conducted by the present inventors have shown that, for a given two-dimensional image, using one of the complex transforms mentioned above other than the Fourier transform produces a resultant hologram of much better quality, i.e. which, when it is reproduced physically and illuminated by a coherent source, produces an image associated with the given two-dimensional image that is finer than those generally produced by prior art systems.

The step of combining the holograms can in particular consist of juxtaposing the holograms of the two-dimensional images in a common digital image constituting the hologram of the object.

The present invention also provides a method of producing a three-dimensional image from a virtual object defined in a three-dimensional geometrical space, characterized in that it includes the following steps:

producing a hologram of the object by the method defined above, physically reproducing the hologram of the object on a spatial light modulator, and illuminating the spatial light modulator in order to reproduce a three-dimensional image of the object from the hologram.

According to one aspect of the invention, the step of illuminating the spatial light modulator consists of illuminating it with three optical waves in turn respectively representing the colors red, green and blue in synchronism with reproduction by the spatial light modulator of a sequence of holograms of the object produced by the hologram production method defined above and each corresponding to one of the three colors, so that a three-dimensional color image of the object is reproduced.

A sequence of holograms can also be physically reproduced by the spatial light modulator, with each of the holograms of the sequence being obtained by the hologram production method defined above, so that after the step of illuminating the spatial light modulator, animated three-dimensional images of the object can be reproduced.

The present invention also provides a system for producing a hologram from a virtual object defined in a three-dimensional geometrical space, characterized in that it includes:

means for storing in memory the virtual object defined in the three-dimensional geometrical space, first computing means for producing a set of two-dimensional images representing the object from respective different viewpoints in the three-dimensional space, second computing means for producing holograms respectively corresponding to the two-dimensional images, and combining means for combining said holograms to form a hologram of the object.

The first computing means can comprise projection computing means for computing the projection of images of the object as seen from respective points of a matrix of points in a first geometrical plane separate from the object onto a second geometrical plane which is preferably between the object and the first plane and parallel to the first plane in the three-dimensional geometrical space.

The projection computing means can comprise means for computing, for each point of the matrix, the projection of points of the object onto the second plane along respective straight lines passing through said points of the object and said each point of the matrix.

The second computing means advantageously comprise:

transform means for transforming a given two-dimensional image defined by a real function into a complex image defined by a complex function, means for oversampling the complex image, simulator means for simulating the production of a diffracted image resulting from the diffraction of an optical wave by the oversampled complex image, means for adding a complex field representing a reference optical wave to the resulting diffractive image, and means for encoding values taken by the amplitude of the sum of said complex field and the diffracted image to produce the hologram associated with the given two-dimensional image.

The transform means can comprise:

means for determining amplitude values each depending on the square root of a corresponding value taken by the real function, and means for associating a phase with each of the amplitude values so that an amplitude value and a phase value are defined for each point of the complex image.

The simulator means can comprise means for computing one of the following complex transforms: Fourier transform, Walsh transform, Hankel transform, orthogonal polynomial transform, Hadamar transform, Karhunen-Loeve transform, multiresolution discrete wavelet transform, and adaptive wavelet transform.

More specifically, the simulator means can comprise means for computing a convolutional product, associated with the oversampled complex image, of two components, by applying the transform which is the inverse of said complex transform to the product of the respective complex transforms of said two components.

The combining means can comprise means for juxtaposing the holograms of the two-dimensional images in one digital image constituting the hologram of the object.

The present invention also provides a system for producing a three-dimensional image from a virtual object defined in a three-dimensional geometrical space, characterized in that it comprises:

a system as defined above for producing a hologram of the object, a spatial light modulator for physically reproducing the hologram of the object, and a light source for illuminating the spatial light modulator in order to reproduce a three-dimensional image of the object from the hologram.

The spatial light modulator comprises a liquid crystal screen having a pixel pitch less than 10 µm and preferably from 1 µm to 2 µm in at least two distinct directions. The expression "pixel pitch" means the period of reproduction of the pixels in a given direction, which corresponds for each pixel to the sum of the dimension of the pixel in the given direction and the distance between that pixel and an adjacent pixel in the same direction. The distance between two pixels is made as small as possible and is preferably substantially zero. The aforementioned two distinct directions respectively correspond to rows and columns of pixels on the liquid crystal screen.

Said system for producing a hologram of the object, the spatial light modulator and the light source can be on the same site. Instead, the system for producing a hologram of the object can be on a first site and the spatial light modulator and the light source on a second site, the first and second sites being remote from each other.

Figure 2:
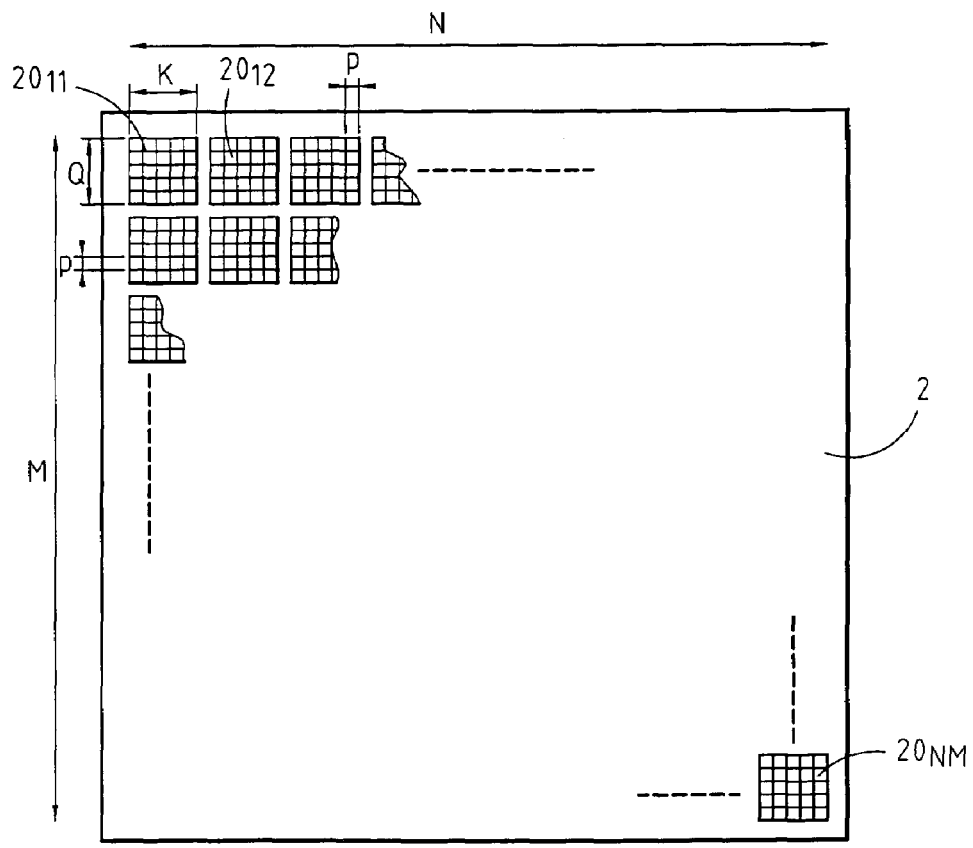
Figure 3:
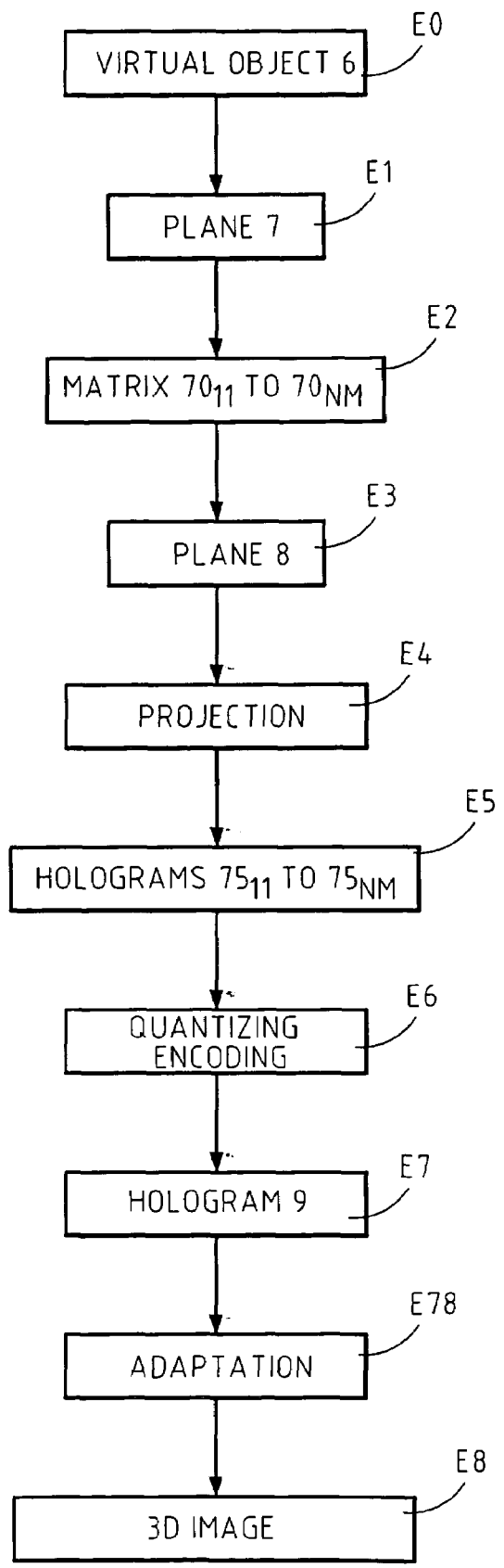
Figure 4:
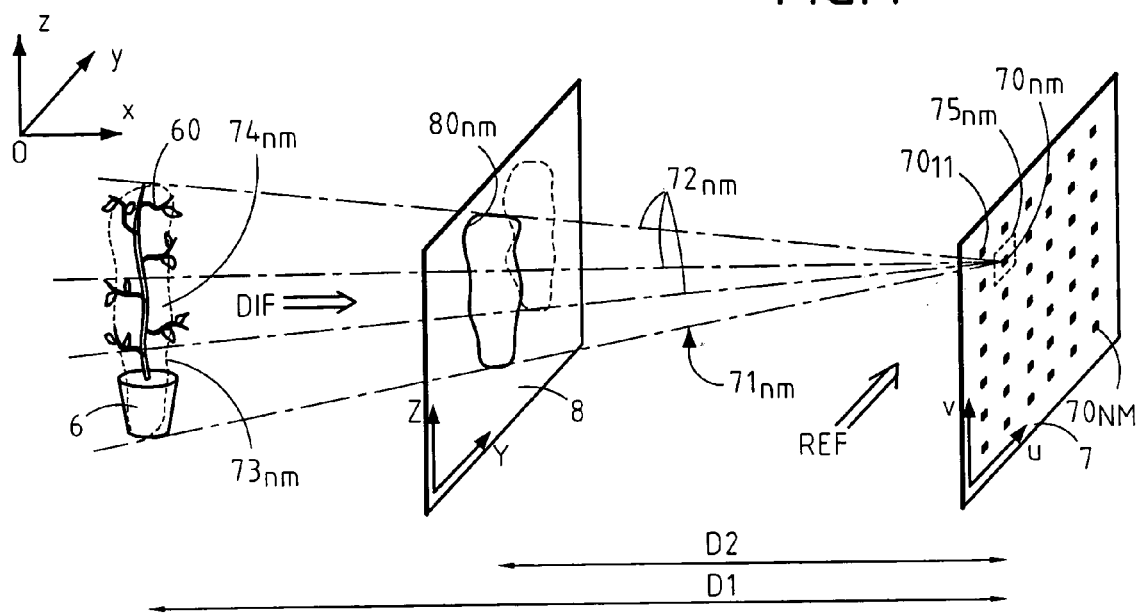
Figure 7:
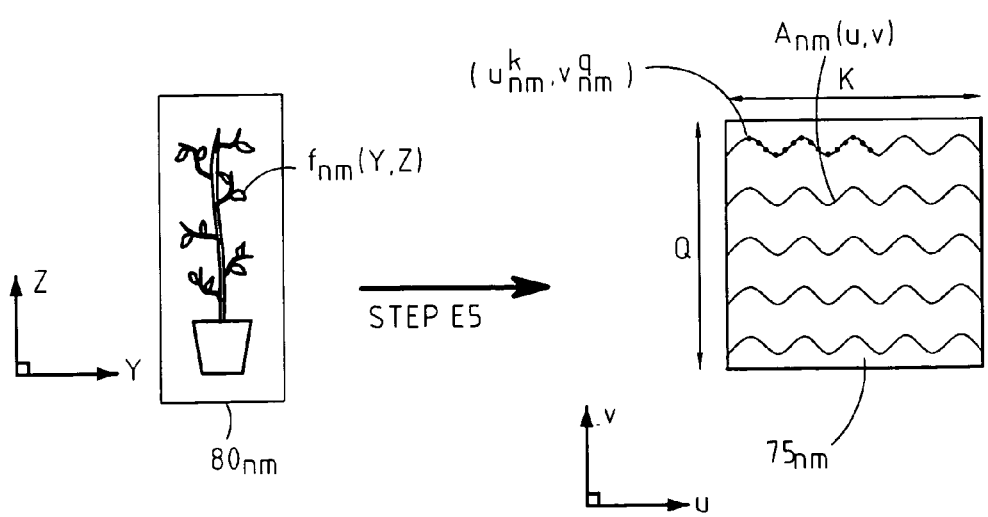
Figure 5:
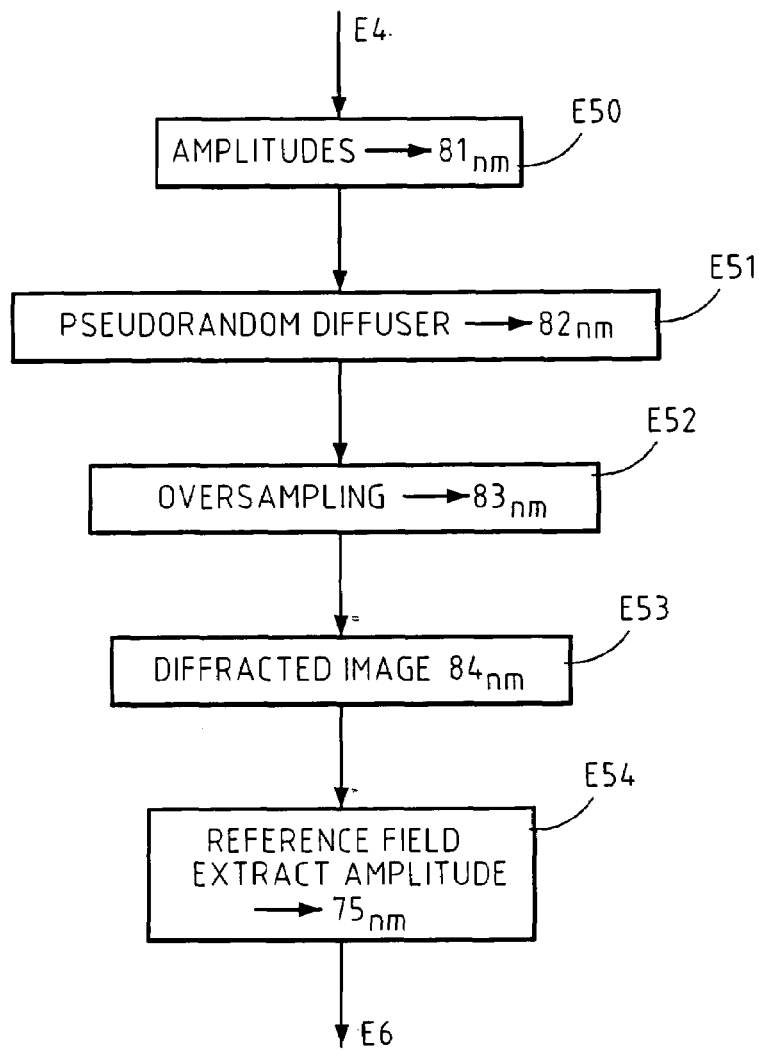
Figure 6:
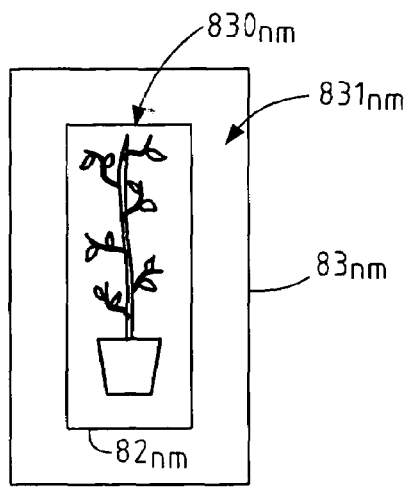
Figure 8:
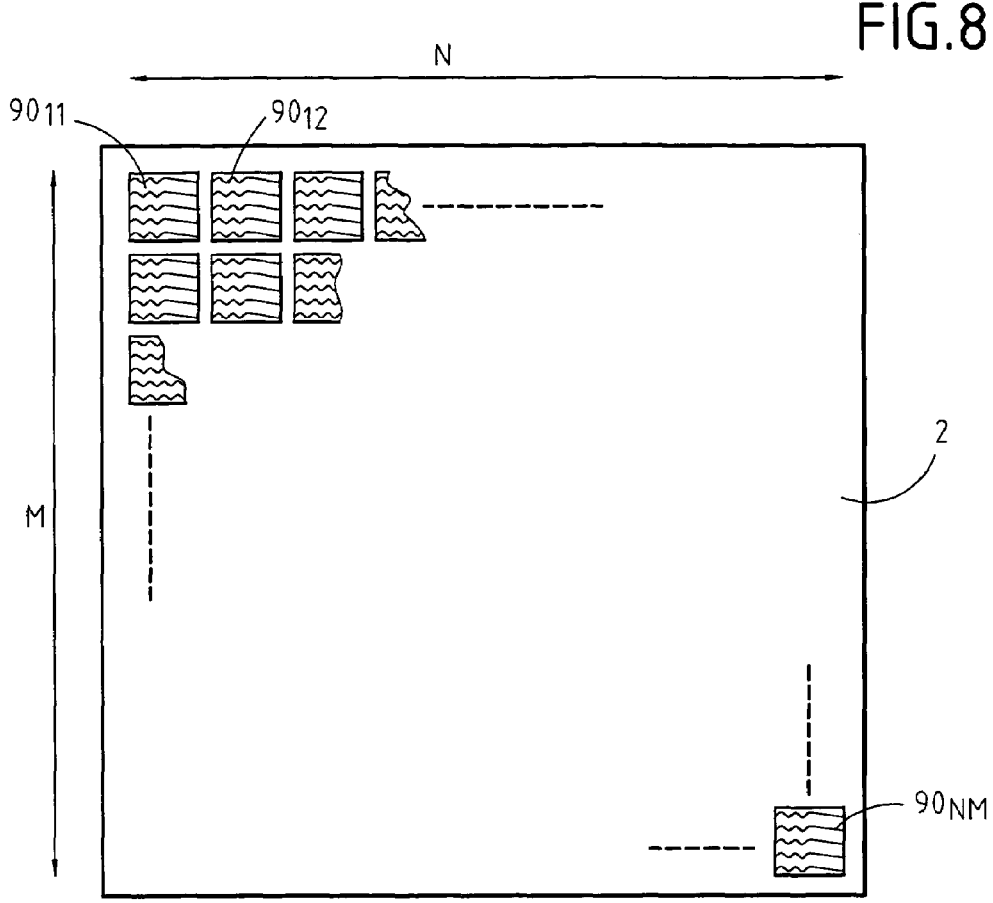
Figure 9:
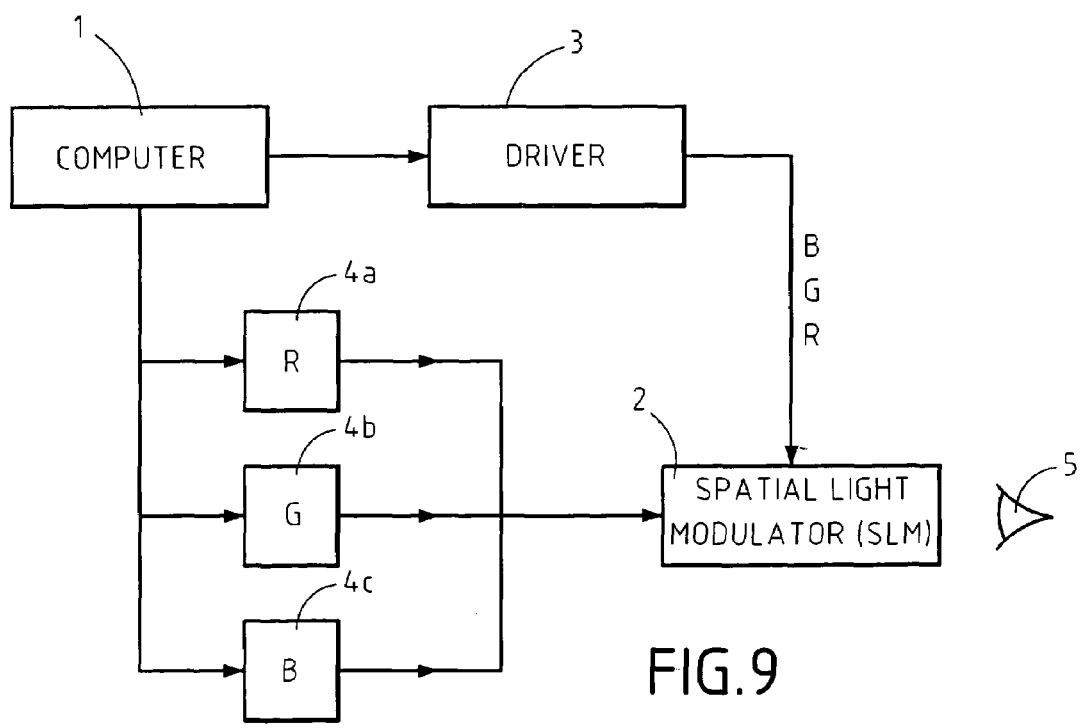

Other advantages of the present invention will become apparent on reading the following detailed description with reference to the accompanying drawings, in which:

FIG. 1 is a block diagram of a first embodiment of a holographic system according to the invention, FIG. 2 is a diagram of the structure of a spatial light modulator (SLM) used in the system shown in FIG. 1, FIG. 3 is a flowchart of an algorithm used in the system shown in FIG. 1, FIG. 4 is a diagram showing projection of images by the algorithm shown in FIG. 3, FIG. 5 is a flowchart of an algorithm used in the system shown in FIG. 1 to produce a hologram from a two-dimensional image, FIG. 6 is a diagram showing oversampling of a two-dimensional image by the algorithm shown in FIG. 5, FIG. 7 shows the production of a hologram from a two-dimensional image, FIG. 8 is a diagram showing a digital hologram generated by the algorithm shown in FIG. 3, and FIG. 9 is a block diagram of a second embodiment of a holographic system according to the invention.

Referring to FIG. 1, a first embodiment of a holographic system of the invention includes a computer 1, a spatial light modulator 2, a driver interface 3 enabling the spatial light modulator 2 to be controlled based on signals output by the computer 1, and a light source 4.

The computer 1 contains a virtual three-dimensional object in a memory (not shown). The virtual object is defined, for example, by a set of triplets of co-ordinates in a system of axes in three-dimensional space, each triplet of co-ordinates corresponding to a point on the external surface of the object. The virtual object is typically obtained in the conventional way by a computer-assisted design (CAD) technique or by any other method of synthesizing voluminal images, such as tomography, or a radiosity or ray launching method associated with a three-dimensional geometrical modeling system.

The computer 1 also contains in a memory an algorithm for generating holograms which is described in more detail below, with reference to FIGS. 3 to 5, and which is used to produce a digital hologram corresponding to the virtual object. The computer 1 controls the spatial modulator 2 via the driver interface 3 so that the hologram generated digitally by the computer 1 is reproduced physically by the spatial modulator 2.

The light source 4 is a source capable of emitting coherent light at a predetermined wavelength $\lambda$, such as a laser or a source of white light associated with a dichroic or interference filter. The coherent length of the light source 4 is predefined as a function of characteristic dimensions of the spatial light modulator 2, in a manner that is known to the skilled person. In the embodiment shown in FIG. 1, the light source 4 is arranged to illuminate the spatial modulator 2 by transmission.

The spatial modulator 2 comprises an array of diffractive cells which are controlled to reproduce the aforementioned digital hologram physically and which diffract the light emitted by the light source 4 so that, by virtue of holographic reconstruction, an observer 5 in front of the spatial modulator 2 sees a three-dimensional image of the virtual object. The spatial light modulator 2, also referred to as a "holographic screen" in the specific application to holography, is typically a liquid crystal screen whose states are transparent or opaque and in which the pixel pitch p in the horizontal and vertical directions is less than 10 µm and preferably from 1 µm to 2 µm. The pixel pitch p in the horizontal or vertical direction is defined as the sum of the dimension of a pixel in that direction and the distance between that pixel and an adjacent pixel in the same direction.

FIG. 2 is a diagram showing the structure of a liquid crystal screen used as the spatial modulator 2 in the present invention. The liquid crystal screen 2 is divided into a predetermined integer number N×M of elementary screens $20_{11}$ to $20_{NM}$ arranged in a matrix, each elementary screen comprising a predetermined integer number K×Q of pixels, also referred to as elementary diffractive cells. The dimensions of each elementary screen are typically 1 mm×1 mm. In the embodiment shown in FIG. 2, the distance between two adjacent pixels is virtually zero and the pixel pitch p is therefore equal to the length of the pixels in the horizontal or vertical direction. The benefit of this screen structure will become more apparent on reading the remainder of the description.

FIGS. 3 to 5 show the method according to the invention. In particular, FIG. 3 shows an algorithm partially implemented in the computer 1 from FIG. 1.

In a preliminary step E0 of the algorithm, a three-dimensional virtual object or scene 6 is stored in a memory of the computer 1. As previously explained, the virtual object 6 is defined by the co-ordinates in a three-dimensional system of axes (O,x,y,z) of points 60 constituting its external surface.

In a first step E1, a first geometrical plane 7, referred to as the hologram computation plane, is defined. In the three-dimensional system of axes (O,x,y,z) the first plane 7 is at a non-zero distance D1 from the virtual object 6, so that the plane 7 and the object 6 are completely separate, as shown in FIG. 4.

In a next step E2, part of the first plane 7 is sampled to define a matrix made up of N×M regularly distributed sampling points $70_{11}$ to $70_{NM}$. Each sampling point $70_{nm}$, where n and m are integers respectively from 1 to N and from 1 to M, sees the virtual object 6 from a respective viewpoint. The image of the object 6 seen from a given sampling point $70_{nm}$ is inscribed within a cone $71_{nm}$ whose apex is the given point $70_{nm}$, whose generatrices are the half-lines $72_{nm}$ which originate from the given point $70_{nm}$ and rest on the apparent contour $73_{nm}$ of the object 6 as seen from the given point $70_{nm}$, and whose base is the surface $74_{nm}$ delimited by the apparent contour $73_{nm}$. To simplify the drawing, FIG. 4 shows only one cone $71_{nm}$.

In a step E3 of the algorithm a second plane 8, referred to as the projection plane, is defined in the three-dimensional system of axes (O,x,y,z). The second plane 8 is separate from the first plane 7 and is preferably between the virtual object 6 and the first plane 7, parallel to the first plane 7 and at a non-zero distance D2 from the first plane 7. The distance D2 between the planes 7 and 8 corresponds in practice to the distance from the spatial modulator 2 at which the three-dimensional image of the object is reproduced and perceived by the observer 5 (see FIG. 1).

In a step E4, the image of the virtual object 6, as seen from each sampling point $70_{nm}$, is projected onto the second plane 8 using a conical projection so that the resultant two-dimensional projected image $80_{nm}$ is inscribed within the cone $71_{nm}$, as shown in FIG. 4. To be more precise, for each sampling point $70_{nm}$ on the plane 7, each point 60 of the outside surface of the virtual object 6 visible from the sampling point $70_{nm}$ is projected onto the second plane 8 along the straight line passing through the point 60 and the sampling point $70_{nm}$ and in the direction of the sampling point $70_{nm}$. The two-dimensional projected image $80_{nm}$ is defined digitally by an intensity distribution $f_{nm}(Y,Z)$, in other words, each point (pixel) of the image $80_{nm}$, identified by its co-ordinates (Y,Z) in the projection plane 8, is associated with an intensity value which is a real number.

When the N×M projected images $80_{11}$ to $80_{NM}$ respectively corresponding to the N×M sampling points $70_{11}$ to $70_{NM}$ have been determined in the second plane 8, holograms $75_{11}$ to $75_{NM}$, one of which is shown diagrammatically in FIGS. 4 and 7, are produced digitally for the respective projected images in a next step E5. The hologram $75_{nm}$ for a given two-dimensional projected image $80_{nm}$ can be computed using a technique known in the art and based on the Fourier transform. A description of a technique of this kind can be found in the article by S. Michelin, D. Arquès and J. C. Grossetie entitled "Fourier-transform computer generated hologram: a variation on the off-axis principle" published in SPIE Conferences 1994, Practical Holography VIII, pages 249-254, or in the article by Olof Bryngdahl and Franck Wyrowski, working under E. Wolf, entitled "Digital Holography-Computer-Generated Holograms", published in Progress in Optics, Volume XXVIII, by Elsevier Science Publisher B.V., 1990. Generally speaking, this technique simulates the analog production of a hologram by applying a series of Fourier transforms to a convolutional product associated with a two-dimensional image, adding a complex field representing a reference optical wave to the series of Fourier transforms thus obtained, and then extracting the amplitude information contained in the sum of the complex field and the series of Fourier transforms.

The present invention employs an algorithm representing an improvement over the conventional methods to implement step E5. FIG. 5 shows this algorithm.

In a step E50, the projected two-dimensional image $80_{nm}$ which is described by the aforementioned intensity distribution $f_{nm}(Y,Z)$ is transformed into a transformed two-dimensional image $81_{nm}$ defined by an amplitude distribution, by computing for each point of the image $80_{nm}$ the square root of the corresponding intensity value.

In a next step E51, a "pseudorandom" diffuser is generated digitally. This diffuser consists of an "image" having the same number of pixels as the projected two-dimensional image $80_{nm}$ and in which each pixel has an intensity value equal to 1 and a random phase. Each phase of the diffuser is then associated with a corresponding pixel of the transformed two-dimensional image $81_{nm}$, to transform the image $81_{nm}$ into a "complex" image $82_{nm}$ in which a complex number defined by an amplitude value and a phase value is determined for each pixel. The pseudorandom diffuser prevents the resulting hologram $75_{nm}$ having excessive amplitude level disparities, by averaging the amplitude values of the hologram.

In a step E52 the complex image $82_{nm}$ obtained in step E51 is oversampled, i.e. the image is included in a larger image, as shown in FIG. 6. An image $83_{nm}$ is thus formed consisting of the complex image $82_{nm}$ in a central part $830_{nm}$ and of pixels whose amplitude is chosen arbitrarily, for example equal to 0, in a complementary peripheral part $831_{nm}$. This oversampling of the complex image $82_{nm}$ increases the number of pixels of the resultant hologram $75_{nm}$ and therefore reproduces a three-dimensional image of the object 6 with greater resolution.

In a step E53, the diffracted image produced in the hologram computation plane 7 when the projected two-dimensional image $80_{nm}$ is illuminated by a fictitious coherent wave DIF of wavelength λ (see FIG. 4) is simulated digitally. Step E53 consists of computing a convolutional product associated with the oversampled complex image $83_{nm}$. The convolutional product conforms to scalar diffraction theory. For example, using a Rayleigh-Sommerfeld scalar diffraction formulation, the two components of the convolutional product can respectively correspond to a complex field representing the oversampled complex image $83_{nm}$ and a complex field representing a spherical optical wave of wavelength λ. The skilled person however knows other types of convolutional product for computing a diffracted image. The convolutional product computed in step E53 uses parameters including the aforementioned distance D2 and the emission wavelength λ of the light source 4.

In accordance with the invention, the convolutional product is computed by applying a complex transform, also referred to as a fast complex transform, to the two components of the convolutional product, computing the product of the resulting fast complex transforms, and then applying the fast complex transform which is the inverse of said fast complex transform to the aforementioned product of the fast complex transforms.

To be more precise, if CONV denotes the convolutional product, C1 and C2 its two components, and T the fast complex transform, then the convolutional product is written:

$$CONV = C1 \otimes C2 = T^{-1}T(C1 \otimes C2)$$

$$CONV = T^{-1}(T(C1)T(C2)).$$

In the present context, the expression "fast complex transform" means a mathematical transform compatible with scalar optical diffraction theory, i.e. whose resulting transformed functions satisfy the conventional scalar diffraction equations. The fast complex transform must also have the property whereby the fast complex transform of a convolutional product of two components is equal to the product of the respective fast complex transforms of each of said two components. The Fourier transform, the orthogonal polynomial transform, the Paley transform, the Hadamar transform, the Walsh transform, the Hankel transform, the Karhunen-Loeve transform, the multiresolution discrete wavelet transform and the adaptive wavelet transform are all fast complex transforms which meet the above conditions. Other appropriate fast complex transforms are composites of at least two of the aforementioned transforms, such as a composite of the Walsh transform and the Hadamar transform. The application of a composite of two transforms T1 and T2 to any image I is defined in standard mathematic terms by the equation:

$$(T1 \circ T2)(I) = T1(T2(I)).$$

Each of the aforementioned fast complex transforms can be used in a specific case. In particular, the fast complex transform is chosen according to the distance D2 from the spatial light modulator 2 at which the three-dimensional optical image of the object 6 is to be reproduced. A Fourier transform is appropriate for a large distance D2. A Walsh transform is more suitable for a smaller distance D2. Also, it has been found that using one of the above-mentioned fast complex transforms other than the Fourier transform gives better results in terms of the quality of the hologram $75_{nm}$ than those obtained using the Fourier transform.

It should be noted that, because the projected two-dimensional image $80_{nm}$ is transformed into a complex image $82_{nm}$, computing the convolutional product associated with the image $80_{nm}$ in step E53 is more practical than in the prior art since the fast complex transform is applied directly to an image $83_{nm}$ defined by a complex function and not to an image defined by a real function.

At the end of step E53, the diffracted image $84_{nm}$ is defined by a complex field made up of a set of complex numbers each of which is associated with a point of the image $84_{nm}$. Each of these complex numbers also depends on the image $83_{nm}$ taken as a whole.

In a next step E54 a complex field simulating a reference optical wave REF of wavelength λ directed towards the hologram computation plane 7 is added, in the plane 7, to the complex field representing the diffracted image $84_{nm}$. The amplitude information contained in the resulting complex field is then extracted in order to produce an interference field. The addition of the aforementioned two complex fields is performed by adding, at each point of the diffracted image $84_{nm}$, the complex number associated with that point and the value at the same point of the complex field representing the reference wave REF. The interference field constitutes the hologram $75_{nm}$ of the two-dimensional projected image $80_{nm}$.

A variant of the FIG. 5 algorithm dispenses with the steps E50 and E51 of producing the complex image and/or the oversampling step E52. In another variant, the oversampling step E52 precedes the steps E50 and E51 of producing the complex image.

The hologram $75_{nm}$ of a given two-dimensional image $80_{nm}$ obtained in step E5 is a diffractive field, or grating, which is computed for a particular wavelength, namely the emission wavelength λ of the light source 4. This hologram, which is present in virtual form in step E5, i.e. represented in the computer 1 by digital data, is such that, if it is reproduced physically by a holographic screen, illuminating said holographic screen with a laser source emitting at the aforementioned wavelength λ reproduces the original two-dimensional image $80_{nm}$ at a given order of diffraction.

Each hologram $75_{nm}$ obtained in step E5 is defined digitally in the computer 1 by a two-dimensional amplitude function $A_{nm}(u,v)$, where (u,v) designate co-ordinates in the hologram computation plane 7 which correspond, for example, to image spatial frequencies when the fast complex transform chosen in step E53 is a Fourier transform. The two-dimensional amplitude function $A_{nm}(u,v)$ is deduced from the two-dimensional intensity function $f_{nm}(Y,Z)$ defining the corresponding projected two-dimensional image $80_{nm}$, as explained above. In practice, the function $A_{nm}(u,v)$ associated with a given hologram $75_{nm}$ is computed only for a series of discrete points $(u,v) = (u^k_{nm}, v^q_{nm})$, where k and q are integers respectively from 1 to K and from 1 to Q (see FIG. 7). The values that the function $A_{nm}(u,v)$ takes can nevertheless be spread continuously between a minimum amplitude value and a maximum amplitude value.

Referring again to FIG. 3, in a step E6 of the algorithm, the values taken by the function $A_{nm}(u,v)$ are quantized and encoded, i.e. each value of the function is associated with a discrete value which is encoded digitally, for example on eight bits. To each pair of discrete points $(u^k_{nm}, v^q_{nm})$ there then corresponds a discrete amplitude value representing one of 256 gray levels. The amplitudes $A_{nm}(u,v)$ can also be quantized more simply by allocating to each amplitude value of $A_{nm}(u,v)$ the discrete value "0" if said amplitude value is below a predetermined threshold or the discrete value "1" if said amplitude value is above the predetermined threshold.

In a next step E7 the quantized and encoded holograms $90_{11}$ to $90_{NM}$ from step E6 are juxtaposed to form a digital image 9 shown in FIG. 8. The holograms $90_{11}$ to $90_{NM}$ are arranged in the digital image 9 with the same configuration as the corresponding sampling points $70_{11}$ to $70_{NM}$ in the first plane 7. The digital image 9 therefore represents a hologram of the virtual object 6.

In a step E8, the digital image (hologram) 9 is sent by the computer 1 to the spatial light modulator 2 via the driver interface 3 so that it can be physically reproduced by the spatial light modulator 2. To be more precise, each elementary screen $20_{nm}$ displays the corresponding hologram $90_{nm}$. By illuminating the spatial modulator 2 by means of the light source 4, a real or virtual three-dimensional optical image of the object 6 can then be reproduced by diffraction of the light emitted from the source 4 by the spatial modulator 2.

The above description applies to a number of pixels (diffractive cells) of the digital image 9 equal to the number of pixels of the holographic screen 2, i.e. equal to N×M×K×Q, and to exactly the same arrangement of the pixels in the digital image 9 and on the screen 2, so that the digital image 9 is perfectly matched to the structure of the screen 2. However, if the number and/or arrangement of the pixels in the image 9 and on the screen 2 are different, an adaptation step E78 precedes the three-dimensional image reproduction step E8 and adapts the digital image 9 to the structure of the holographic screen 2.

As already mentioned, the holograms $90_{11}$ to $90_{NM}$ of the two-dimensional images $80_{11}$ to $80_{NM}$, and therefore the hologram 9 of the object 6, are computed for the emission wavelength of the light source 4. The three-dimensional image of the virtual object 6 is therefore reproduced by the screen 2 in the color corresponding to that wavelength.

FIG. 9 shows a second embodiment of the holographic system according to the invention. This second embodiment differs from the first embodiment, shown in FIG. 1, in that the light source 4 is replaced by three light sources 4a, 4b and 4c respectively producing coherent red, green and blue light. The light sources 4a, 4b and 4c are controlled by the computer 1 via a dedicated interface (not shown) so that they emit light in turn and in synchronism with the reproduction by the spatial modulator 2 of a sequence of holograms computed by the computer 1 and each corresponding to one of the colors red, green and blue (RGB). Thus each light source 4a, 4b and 4c illuminates the spatial modulator when a hologram respectively associated with the color red, green or blue is displayed by the spatial light modulator 2. Using this time-division multiplexing technique, it is possible to reproduce a three-dimensional color image of the virtual object 6.

The invention is not limited to illumination of the spatial modulator 2 by transmission. Thus in the embodiments shown in FIGS. 1 and 9 the respective light sources 4 and 4a, 4b, 4c can be on the same side of the spatial modulator 2 as the observer 5, so as to diffract light reflected from the spatial modulator 2.

The spatial light modulator 2 used in the present invention is capable of reproducing holograms in real time. Accordingly, the method described with reference to FIGS. 3 to 5 can be used for sequences of three-dimensional images to reproduce animated images.

In the embodiment shown in FIGS. 1 and 9, the holographic system is all on one site. However, the holographic system according to the invention can instead be divided into two remote systems, namely a first system, referred to as the "transmitter", implementing the digital steps E0 through E7 of the algorithm shown in FIG. 3, i.e. producing the digital hologram 9 from the virtual object 6, and the second system, referred to as the "receiver", implementing the subsequent steps E78 and E8. The hologram 9 produced by the transmitter is transmitted to the receiver in the form of a digital signal via a transmission medium.

In another variant of the invention, the holographic system is on one site but receives the virtual object 6 from a remote transmitter.

The invention claimed is:

1. A method for producing a hologram from a virtual object (6) defined in a three-dimensional geometrical space said method comprising the steps of:
   computing (E1-E4) a set of two-dimensional images ($80_{nm}$) representing the object as seen from respective different viewpoints in the three-dimensional geometrical space, each of said two-dimensional images ($80_{nm}$) representing the object as seen from one of said different viewpoints,
   computing (E5-E6) a set of elementary holograms ($90_{nm}$), each of said elementary holograms corresponding to one of said two-dimensional images, and
   combining (E7) said elementary holograms ($90_{nm}$) in a combined digital image to form a hologram (9) of the object (6),
   wherein each of said two-dimensional images ($80_{nm}$) comprises coordinates (Y,Z) and is defined by an intensity distribution ($f_{nm}(Y,Z)$) over said coordinates, and wherein said step (E5-E6) of computing the elementary holograms for a given two-dimensional image ($80_{nm}$) comprises the following steps:
   converting (E50, E51) the two-dimensional image defined by the corresponding real function into a complex image defined by a complex function,
   oversampling (E52) the complex image ($82_{nm}$),
   simulating illumination of the oversampled complex image by an optical wave (DIF) to obtain a diffracted image ($84_{nm}$),
   adding (E54) a complex field representing a reference optical wave (REF) to the resulting diffracted image ($84_{nm}$) to produce an interference field, and
   extracting (E6) amplitude values of the sum of said complex field and the resulting diffracted image ($84_{nm}$) to produce the hologram ($90_{nm}$) associated with said given two-dimensional image ($80_{nm}$),
   wherein said step of computing the set of two-dimensional images includes the following steps:
   defining a first geometrical plane (7) in the three-dimensional geometrical space, said first geometrical plane being separate from said object,
   defining (E1-E2) a matrix of points ($70_{nm}$) in said first geometrical plane (7), each of said points corresponding to one of said different viewpoints,
   defining a second geometrical plane (8), said second geometrical plane (8) being parallel to said first geometrical plane and preferably located between the object (6) and the first geometrical plane (7), and
   projecting (E3-E4) images of the object as respectively seen from said points ($70_{nm}$) of said matrix onto said second geometrical plane (8), wherein the projected image constitute said two-dimensional images ($80_{nm}$).

2. A method according to claim 1, wherein, for each point ($70_{nm}$) of the matrix, said projection step consists of projecting points (60) of the object (6) onto the second plane (8) along respective straight lines passing through said points of the object and said each point of the matrix.

3. A method according to claim 1, wherein said step (E5-E6) of computing the holograms is implemented using a technique employing a Fourier transform.

4. A method according to claim 1, wherein said converting step includes the following steps:
   determining (E50) amplitudes associated with pixels of the complex image, said amplitudes depending, for each pixel of said image, on the square root of a corresponding intensity value of said real function of the given two-dimensional image defined by said real function, and
   associating (E51) a phase with each of said amplitudes so that an amplitude and a phase are defined for each point of the complex image.

5. A method according to claim 1, wherein said step of simulating illumination of the oversampled complex image by an optical wave (DIF) comprises the step of calculating said diffracted image, said diffracted image calculating step comprising the steps of:
   calculating a convolution product of the oversampled complex image and a function describing said optical wave, wherein the convolution product is obtained by first performing a complex transformation on said oversampled complex image and said function describing said optical wave respectively and then an inverse complex transformation of the product of the transformed complex image and the transformed function describing said optical wave to obtain the diffracted image, wherein said inverse complex transformation is the inverse of said complex transformation.

6. A method according to claim 5, wherein said complex transformation is at least one of a Fourier transform, Walsh transform, Hankel transform, orthogonal polynomial transform, Hadamar transform, Karhunen-Loeve transform, multiresolution discrete wavelet transform, adaptive wavelet transform and a transform consisting of a composite of at least two of the above transforms.

7. A method according to claim 1, wherein said step (E7) of combining the holograms comprises juxtaposing the holograms ($90_{nm}$) of the two-dimensional images ($80_{nm}$) in said combined digital image (9) constituting said hologram (9) of the object (6).

8. A method of producing a three-dimensional image from a virtual object (6) defined in a three-dimensional geometrical space, comprising the following steps:
producing a hologram (9) of the object (6) by a method according to one of claims 1, 2, 3, and 4 to 7,
physically reproducing (E8) said hologram (9) of the object (6) on a spatial light modulator (2), and
illuminating (E8) the spatial light modulator (2) in order to reproduce a three-dimensional image of the object (6) from the hologram (9).

9. A method according to claim 8, wherein said spatial light modulator (2) comprises a liquid crystal screen having a pixel pitch less than 10 µm and preferably from 1 µm to 2 µm in at least two different directions.

10. A method according to claim 8, wherein the step of illuminating the spatial light modulator (2) consists of illuminating said spatial light modulator with three optical waves (4a, 4b, 4c) respectively representing the colors red, green and blue (RGB) in turn and in synchronism with reproduction by the spatial light modulator (2) of a sequence of holograms of the object, each hologram corresponding to one of the said three colors, so that a three-dimensional color image of the object (6) is reproduced.

11. A method according to claim 8, wherein a sequence of holograms is physically reproduced by the spatial light modulator (2) so as to reproduce animated three-dimensional images of the object (6) after the step of illuminating the spatial light modulator.

12. A system for producing a hologram from a virtual object (6) defined in a three-dimensional geometrical space, comprising:
memory means (1) for storing the virtual object (6) defined in the three-dimensional geometrical space,
first computing means (1) for producing a set of two-dimensional images ($80_{nm}$) representing the object (6) as seen from respective different viewpoints in the three-dimensional geometrical space, each of said two-dimensional images ($80_{nm}$) representing the object as seen from one of said different viewpoints;
second computing means (1) for producing elementary holograms ($90_{nm}$), each of said elementary holograms corresponding to one of said two-dimensional images ($80_{nm}$), and
combining means (1) for combining said elementary holograms ($90_{nm}$) in a common digital image to form a hologram (9) of the object (6),
wherein each of said two-dimensional images ($80_{nm}$) comprises coordinates (Y,Z) and is defined by an intensity distribution ($f_{nm}(Y,Z)$) over said coordinates, and wherein the second computing means comprise:
converting means (1) for converting (E50, E51) a given two-dimensional image ($80_{nm}$) defined by the corresponding real function into a complex image defined by a complex function,
means (1) for oversampling (E52) the complex image, means for simulating illumination of the oversampled complex image by an optical wave (DIF) to obtain a diffracted image ($84_{nm}$),
means (1) for adding (E54) a complex field representing a reference optical wave (REF) to the resulting diffracted image ($84_{nm}$) to produce an interference field, and
means (1) for extracting (E6) values of the amplitude of the sum of said complex field and the diffracted image ($84_{nm}$) to produce the hologram ($90_{nm}$) associated with said given two-dimensional image ($80_{nm}$),
wherein said first computing means comprise projection computing means (1) for computing a projection of images of said object (6) as seen from respective points ($70_{nm}$) of a matrix of points in a first geometrical plane (7) separate from the object (6) onto a second geometrical plane (8) which is preferably between the object (6) and the first plane (7) and parallel to the first plane (7) in the three-dimensional geometrical space (O, x, y, z), wherein each of said points of said matrix of points corresponds to one of said different viewpoints.

13. The system claimed in claim 12, wherein said projection computing means comprise means (1) for computing, for each point ($70_{nm}$) of the matrix, the projection of points (60) of the object (6) onto the second plane (8) along respective straight lines passing through said points of the object and said point of the matrix.

14. A system according to claim 12, wherein said converting means comprise:
means (1) for determining (E50) amplitudes associated with each pixel of said complex image, said amplitudes depending, for each pixel of said image, on the square root of a corresponding intensity value of said real function of the given two-dimensional image defined by said real function, and
means (1) for associating (E51) a phase with each of said amplitudes so that an amplitude and a phase are defined for each point of the complex image.

15. A system according to claim 12, wherein said simulator means comprise means for calculating said diffracted image by calculating a convolution product of the oversampled complex image and a function describing said optical wave, wherein the convolution product is obtained by first performing a complex transformation on said oversampled complex image and said function describing said optical wave respectively and then an inverse complex transformation of the product of the transformed complex image and the transformed function describing said optical wave to obtain the diffracted image, wherein said inverse complex transformation is the inverse of said complex transformation.

16. A system according to claim 15, wherein said complex transformation is at least one of a Fourier transform, Walsh transform, Hankel transform, orthogonal polynomial transform, Hadamar transform, Karhunen-Loeve transform, multiresolution discrete wavelet transform, adaptive wavelet transform and a transform consisting of a composite of at least two of the above transforms.

17. A system according to claim 12, wherein the combining means (1) comprise means for juxtaposing the holograms ($90_{nm}$) of the two-dimensional images ($80_{nm}$) in said combined digital image (9) constituting said hologram of the object (6).

18. A system for producing a three-dimensional image from a virtual object (6) defined in a three-dimensional geometrical space, comprising:

a system according to one of claims 12, 13, and 14 to 17 for producing a hologram (9) of the object (6), a spatial light modulator (2) for physically implementing the hologram (9) of the object, and a light source (4) for illuminating the spatial light modulator (2) in order to reproduce a three-dimensional image of the object (6) from the hologram (9).

19. A system according to claim 18, wherein said spatial light modulator (2) comprises a liquid crystal screen having a pixel pitch less than 10 μm in at least two different directions.

20. A system according to claim 18, wherein said light source comprises three separate light sources (4a, 4b, 4c) for illuminating the spatial light modulator (2) with three optical waves respectively representing the colors red, green, and blue (RGB) in turn and in synchronism with the reproduction by the spatial light modulator (2) of a sequence of holograms of the object, each hologram corresponding to one of said three colors so that a three-dimensional color image of the object is reproduced.

21. A system according to claim 18, wherein said system for producing a hologram of said object is on a first site, the spatial light modulator (2) and the light source (4) are on a second site and the first and second sites are remote from each other.

22. A system according to claim 18, wherein said pixel pitch is between 1 μm to 2 μm in at least two different directions.

* * * * *